INVENTOR.
Gerald J. Partridge
BY
Barnard, McGlynn & Reising
ATTORNEYS

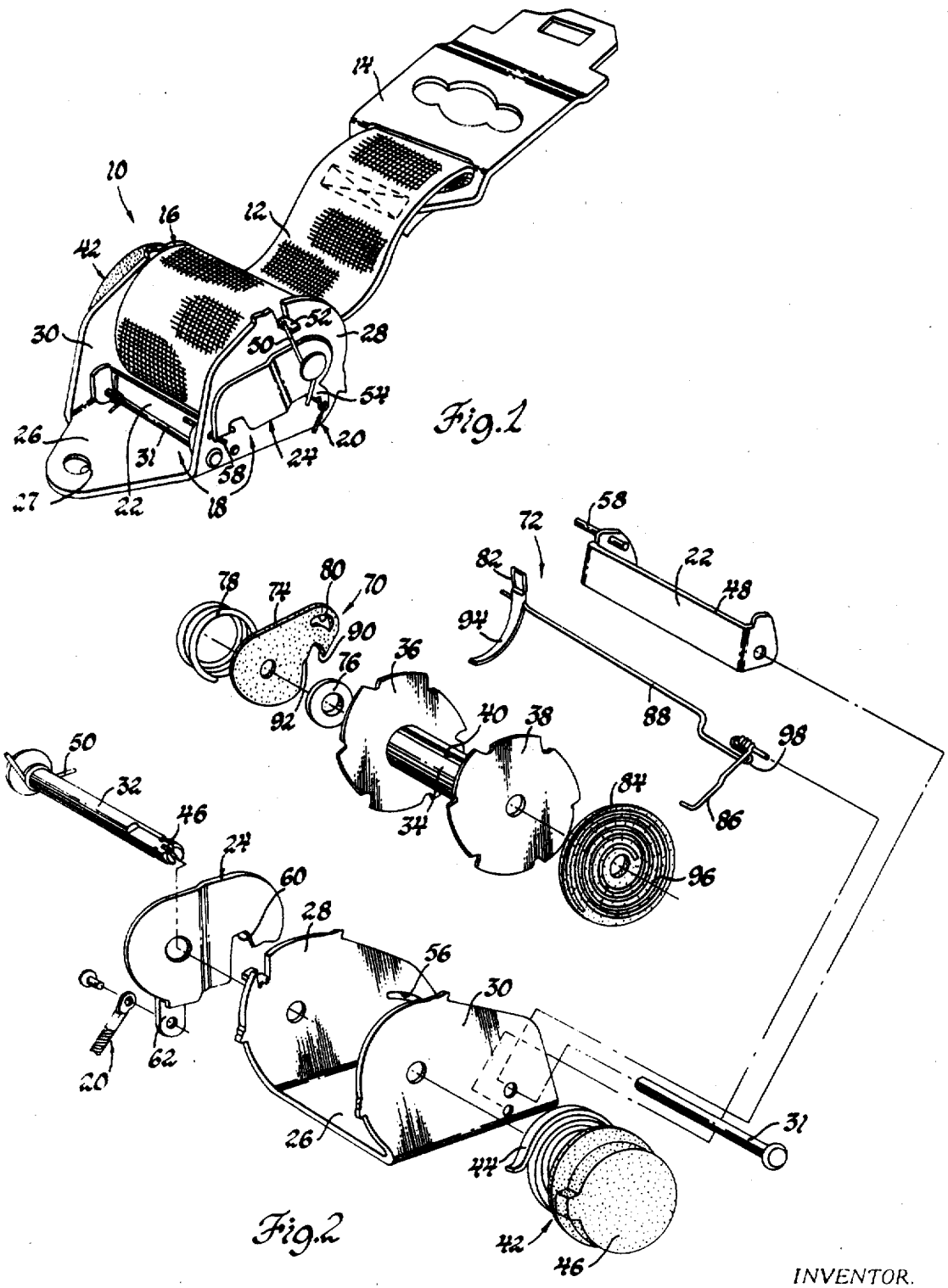

United States Patent Office 3,664,599
Patented May 23, 1972

---

3,664,599
DOUBLE LOCKING RETRACTABLE SEAT BELT ASSEMBLY
Gerald J. Partridge, Roseville, Mich., assignor to Jim Robbins Seat Belt Company, Mount Clemens, Mich.
Filed Jan. 13, 1970, Ser. No. 2,565
Int. Cl. A62b *35/00*
U.S. Cl. 242—107.4
5 Claims

ABSTRACT OF THE DISCLOSURE

A retractable seat belt assembly including a U-shaped support bracket rotatably supporting a reel means from which the seat belt is protracted and retracted by being unwound and wound thereabout. A locking pawl is supported by the bracket for movement to and from a locking position for preventing rotation of the reel means in the unwinding direction. A clutch member engages the locking pawl and is rotated by the reel means for moving the locking pawl to the locked position. A cam operated stop member is movable to and from a position for preventing the movement of the clutch member which would move the locking pawl to the locked position until a predetermined length of the seat belt is unwound from the reel means. The locking pawl has an extension extending through an opening in one of the walls of the bracket and which coacts with a recess in a latch plate for maintaining the locking pawl in the locked position to prevent protraction or retraction of the seat belt in response to a predetermined protraction and retraction of the seat belt. The latch plate may be moved out of the latched position for allowing the locking pawl to move to the unlocked position by a manually operated push-pull remote control assembly.

---

This invention relates to safety seat belt assemblies of the type utilized in automobiles as restraining devices. It has been common practice to utilize roll-up or retracting assemblies which wind up or retract at least one-half of the disconnected belt sections so that such sections do not remain loosely disposed on the seat when not in use.

Seat belt arrangements presently utilized in automobiles include two lap belts which are connected together usually through a buckle and a shoulder strap which extends over the shoulder and is attached to the two connected lap belts. At least one of the lap belts is normally secured to a retracting device so that when the belt is not in use it is retracted to a position adjacent the seat and out of the way. Retractors are also frequently utilized with the shoulder strap but such retractors must have a mode of operation that limits protraction or extension of the strap so as to make sure that the occupant is properly restrained by the shoulder strap. It is also desirable to allow the occupant some degree of freedom of movement when utilizing a shoulder strap and, therefore, many of the devices utilized with shoulder straps are inertia devices which upon a given deacceleration or force being applied to the shoulder strap prevent further protraction of the shoulder strap. As an alternative to inertial devices, there are retracting assemblies wherein the seat belt may be, or shoulder strap may be, extended a given amount and upon discontinuance of that extension followed by slight retraction, a locking mechanism is rendered operative to prevent further extension of protraction of the seat belt or shoulder strap. This type of assembly is not particularly satisfactory when utilized with shoulder straps because once the shoulder strap is extended and buckled to the lap belts, it is prevented from further extension or protraction. Yet each time the occupant moves rearwardly the shoulder strap is retracted into the retraction assembly and is prevented from further protraction. Consequently, if the occupant continues to move rearwardly in the seat he may reach a position where the shoulder strap is taut and prevents any movement of the occupant away from the seat back. Normally, an occupant may extend a shoulder strap and connect it to the connected lap belts while remaining in a comfortable position with respect to the seat back and which position is also satisfactory for restraining purposes.

Accordingly, it is an object and feature of this invention to provide a retractable seat belt assembly particularly suitable for use with shoulder straps wherein the shoulder strap may be extended and connected to the lap belts and further protraction or retraction of the shoulder strap is prevented by the retracting assembly. Such allows the shoulder strap to remain at a selected extended length suitable for an occupant who continually and repeatedly occupies the same position in an automobile, as for example the driver who repeatedly is the only driver of the automobile. The retractable assembly is manually releasable for allowing the seat belt or shoulder strap to be fully retracted when desired.

In correlation with the foregoing object and feature, it another object and feature of this invention to provide such a retracting seat belt assembly including retractor means for protraction and retraction of the seat belt with locking means for preventing protraction and retraction of the seat belt.

In correlation with the foregoing objects and features, it is another object and feature of this invention to provide such a retractable seat belt assembly wherein the locking means is movable between locked and unlocked positions and movable to the locked position in response to a predetermined protraction and retraction of the seat belt for preventing further protraction and retraction of the seat belt.

In correlation with the foregoing objects and features, it is another object and features of this invention to provide such as retractable seat belt assembly including manually operable release means for releasing the locking means to allow the latter to move to the unlocked position.

In correlation with the foregoing objects and features of this invention, it is another object and feature of this invention to provide such a retracting assembly where the locking means includes a locking pawl movable between a locked position in engagement with the retractor means and an unlocked position out of engagement with the retractor means and latch means movable between an unlatched position and a latched position engaging the locking pawl for maintaining the locking pawl in the locked position.

Other objects and attendant advantages of the present invention will be readily appreciated as the same becomes better understood by reference to the following detailed description when considered in connection with the accompanying drawings wherein:

FIG. 1 is a prospective view of a preferred embodiment of the instant invention;

FIG. 2 is an exploded view of the preferred embodiment;

Figure 3:
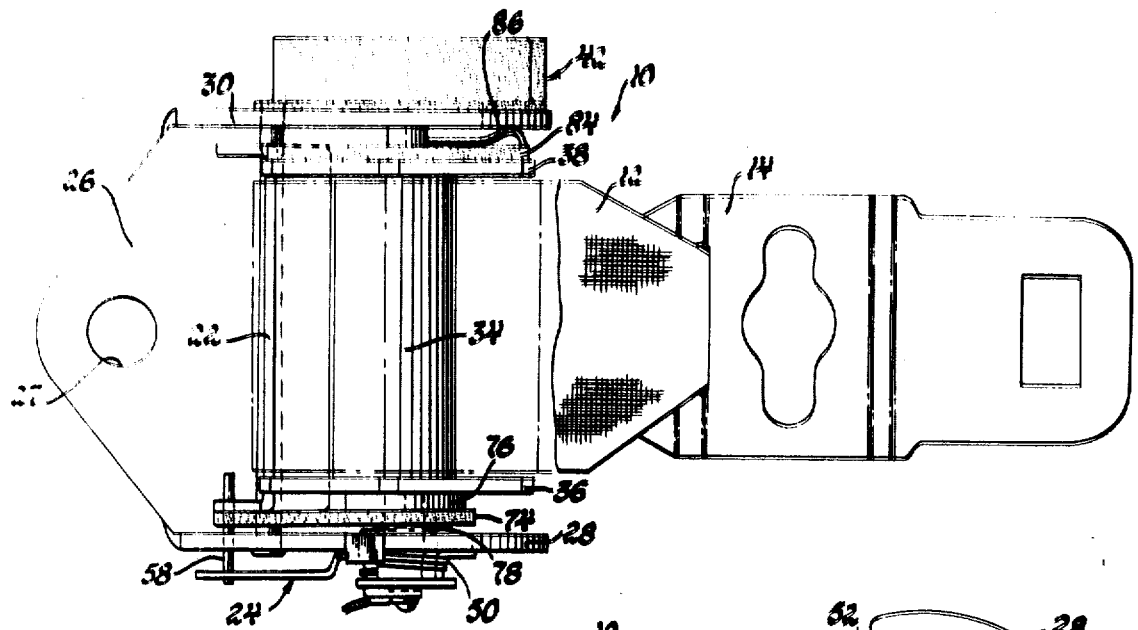
FIG. 3 is a fragmentary plan view of the preferred embodiment.

Referring now to the drawings wherein like numerals indicate like or corresponding parts throughout the several views, a preferred embodiment of the retractable seat belt assembly of the instant invention is generally shown at 10. The retractable seat belt assembly includes a seat belt 12 which is connected to a tongue 14. The tongue 14 is illustrative of one of many types which may be attached to a buckle or to a buckle assembly between two lap belts.

Referring now to FIG. 1, the seat belt assembly 10 also includes retractor means generally indicated at 16 for protraction and retraction of the seat belt and locking means generally indicated at 18 for preventing protraction and retraction of the seat belt.

Figure 4:
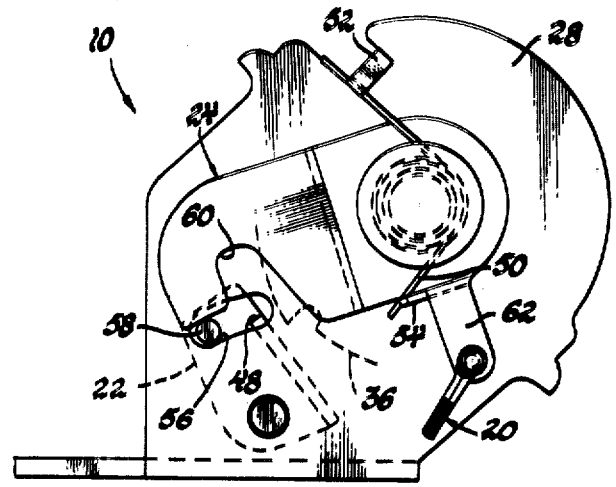
FIG. 4 is a side elevational view of the preferred embodiment shown in the unlocked position.
Figure 5:
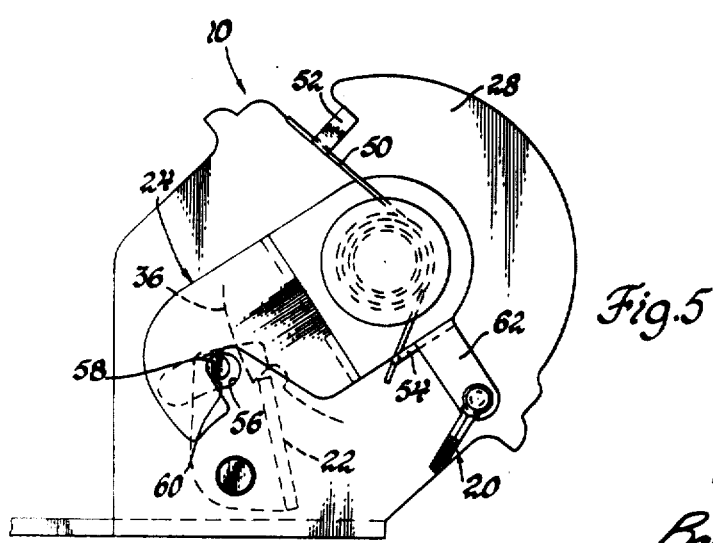
FIG. 5 is an elevational view similar to FIG. 4 but showing the assembly in the locked position.

The locking means 18 is movable from an unlocked position, as shown in FIG. 4, to a locked position, as shown in FIG. 5, for preventing protraction and retraction of the seat belt 12 in response to a predetermined movement of the seat belt 12. More specifically, the locking means 18 is movable between locked and unlocked positions and is movable to the locked position, illustrated in FIG. 5, in response to a predetermined protraction and retraction of the seat belt 12 for preventing further protraction and retraction of the seat belt 12.

There is also included a manually actuatable release means generally indicated at 20 for releasing the locking means 18 to allow the latter to move to the unlocked position.

The locking means 18 includes a locking pawl 22 movable between a locked position in engagement with the retractor means, as illustrated in FIG. 5, and an unlocked position out of engagement with the retractor means, as illustrated in FIG. 4. The locking means 18 also includes the latch means generally indicated at 24 and movable between an unlatched position, as illustrated in FIG. 4, and a latched position, as illustrated in FIG. 5, engaging the locking pawl 22 for maintaining the locking pawl in the locked position.

The locking pawl 22 is rotatably supported by and extends between the walls 28 and 30, the locking pawl being rotatably supported between the walls by the pin 31.

The retractor means 16 includes a support means comprising a generally U-shaped bracket having a base 26 and first and second parallel side walls 28 and 30. The shaft 32 extends between the side walls 28 and 30 and is rotatably supported by the side walls 28.

The base 26 has a hole 27 therethrough so that the support means or U-shaped bracket may be attached to a vehicle.

A reel means is rotatably supported by the support means and the seat belt 12 is connected to the reel means and is adapted to be retracted and protracted by being wound and unwound therefrom. More specifically, the reel means includes a cylinder 34 concentrically disposed about the shaft 32. Also include are the circular plate like ratchet members 36 and 38 secured to each end of the cylinder 34. The ratchet members 36 and 38 are rotatably supported by the shaft 32 for rotation relative to the walls 28 and 30 of the U-shaped bracket or support means. The cylinder 34 has a slot 40 extending therealong and the seat belt 12 is connected or looped about the shaft 32 and extends outwardly through the slot 40 so as to be wound and unwound about the cylinder 34. The reel means also includes a biasing means generally indicated at 42 for urging the ratchet members 36 and 38 and the cylinder 34 to rotate in a winding direction. The biasing means 42 comprises a spiral spring 44 for urging the shaft 32, and therefore, the ratchet members 36 and 38 and the cylinder 34, to rotate in the winding direction. One end of the spring 44 is disposed in a slot 46 in the shaft 32 and the other end of the spring 44 is disposed in a slot (not shown) in the housing 46, the housing 46 being secured to the outside of the wall 30.

The ratchet members 36 and 38 have teeth disposed thereabout which are engaged by the upper edge 48 of the locking pawl 22 when in the locked position as illustrated in FIG. 5.

The latch means 24 is a latch plate rotatably supported on the shaft 32 so as to be movable supported by the U-shaped bracket or support means for movement between the latched and unlatched positions. A biasing means comprising the spring 50 urges the latch plate 24 to the latched position. The spring 50 has one arm engaging a struck out portion 52 from the wall 28 and another arm engaging the tab 54 which extends outwardly and is integral with the latch plate 24. The first wall 28 has an opening 56 extending therethrough and the locking pawl 22 includes an extension 58 which extends through the opening 56 to coact with the latch plate 24. The latch plate 24 is disposed outwardly of the wall 28 and includes a recess 60 in which the extension 58 is disposed when the latch plate 24 is in the latched position, as illustrated in FIG. 5. Therefore, the locking pawl 22 and the latch plate 24 are interconnected by an extension 58 and the recess 60 when in the locked and latched positions respectively. Normally, the latch plate 24 rests upon the extension 58 when in the unlatched position, as illustrated in FIG. 4; however, when the locking pawl 22 is moved to the locked position, the extension 58 moves into the area of the recess 60 whereby the latch plate 24 is then movable to the latched position under the biasing action of the spring 50.

When the locking pawl 22 is in the locked position engaging the teeth in the ratchet members 36 and 38, as shown in FIG. 5, the ratchet members 36 and 38 are prevented from rotating in either direction since the latching plate 24 maintains the locking pawl 22 in tight engaged relationship with the teeth in the ratchet members 36 and 38 to prevent their rotation in either direction.

The manually actuated release means 20 preferably comprises a manually operable push-pull remote control assembly which is attached to an arm 62 of the latch plate whereby upon placing a tension or moving force on the push-pull remote control assembly or cable 20, the latch plate 24 is rotated in the clockwise direction as viewed in FIG. 5 to move the recess 60 away from the extension 58 thereby allowing the extension 58 to move to the left as the locking pawl 22 moves from the locked position to the unlocked position.

The locking means 18 further includes a clutch means generally indicated at 70 in FIG. 2 for moving the locking pawl 22 between the locked and unlocked positions in response to rotation of the reel means. The locking means 18 also includes a movable stop means, generally indicated at 72 in FIG. 2, for preventing movement of the locking pawl 22 to the locked position by the clutch means until a predetermined length of the seat belt 12 has been unwound from the reel means. The clutch means 70 and the stop means 72 are mechanically connected to and operated by the reel means.

The clutch means 70 includes a clutch plate 74 which is rotatably supported on the shaft 32 between the first wall 28 and the adjacent ratchet member 36. A friction member 76 is disposed between the clutch plate 74 and the adjacent ratchet member 36. There is also included biasing means comprising the spring 78 for biasing the clutch plate 74 into engagement with the friction member 76 whereby the clutch plate 74 is rotated by the ratchet member 36 through the friction member 76. The clutch plate 74 is operatively connected to the locking pawl 22 through the extension or pin 58 and a slot 80 in the plate 74.

The stop means 72 includes a stop member 82, a cam member 84, a cam follower 86, and linkage 88 interconnecting the cam follower 86 and the stop member 82. The stop means 72 prevents movement of the locking pawl 22 to the locked position by the clutch plate 74 until a predetermined length of the seat belt 12 has been unwound from the reel means, i.e., until the ratchet members 36 and 38 have rotated a predetermined number of revolutions. The clutch plate 74 has a recess 90 which includes a shoulder 92. The stop member 82 is engageable with the clutch plate 74 and is movable to a stop position engaging the shoulder 92 for preventing rotation of the clutch plate 74 in the direction for moving the locking pawl 22 to the locked position. The stop member 82 is movable to a release position disposed in the large part of the recess 90 for allowing rotation of the clutch plate 74 to move the locking pawl 22 to the locked position. Stop member 82 is supported by a leaf spring type member 94 which is secured to the base 26 and urges the stop member 82 to move to the release position. During initial unwinding, the clutch plate 74 is urged to rotate in the clockwise direction, as viewed in FIG. 2, whereby the stop member 82 engages the shoulder 92 and is retained therein. Once extension or unwinding of seat belt 12 is sufficient and there occurs a slight rewinding or retracting movement, the clutch plate 74 rotates in the counterclockwise direction, as viewed in FIG. 2, and the stop member 82 moves into the recess 90 whereupon further extension of the seat belt rotates the clutch plate 74 in clockwise direction to move the locking pawl 22 into the locked position due to the coaction between the pin 58 and the slot 80.

The cam member 84 is secured to the second ratchet member 38 so as to be rotatable therewith and has a cam track 96 which is at least in part spirally disposed about the axis of the shaft 32 and is disposed in a plane substantially perpendicular to the shaft 32. The cam follower 86 is disposed in the cam track 96 at one end and is rotatably disposed about the wire-like member comprising the linkage means 88. The linkage means 88 has each end thereof rotatably disposed in the side walls 28 and 30 and has an offset portion operatively connected to the stop member 82 and an irregular portion 98 which is engaged by the link of the cam follower 86. When the seat belt 12 is in the fully retracted position, the end of the cam follower 86 which is disposed in the cam track 96 is disposed radially outwardly in the cam member 84 and the length of the cam follower 86 engages the irregular portion 98 to rotate and maintain the stop member 82 in the stop position engaging the shoulder 92. Upon extension of the seat belt 12, the end of the cam follower 86 moves radially inwardly to allow the stop member 82 to move to the release position whereby the clutch plate 74 may move in a clockwise direction as viewed in FIG. 2. In other words, the linkage means 88 operatively interconnects the cam follower 86 and the stop member 82 so that the stop member 82 is prevented from moving from the stop position engaging the shoulder 92 until the cam follower 86 has been moved radially relative to the axis of the shaft 32 a predetermined amount as a result of the unwinding of the flexible seat belt 12 a predetermined length as the reel means is rotated.

In operation, the retractable seat belt assembly is normally in a stored condition wherein the seat belt 12 is fully retracted or wound upon the reel means. As the seat belt is protracted or unwound from the reel means, stop member 82 engages the shoulder 92 to prevent the clutch plate 74 from rotating in a clockwise direction as viewed in FIG. 2. During the unwinding of the seat belt the cam follower 86 moves radially inwardly to a position for allowing the stop member 82 to move out of engagement with the shoulder 92. When protraction or extending or unwinding of the seat belt is discontinued and there is a slight retraction or winding of the seat belt, the stop member 82 moves from the shoulder 92 into the large recess 90 thereby allowing the clutch plate 74 to rotate in the clockwise direction so that the slot 80 coacts with the extension or pin 58 to move the locking pawl 22 to the locked position engaging the ratchet members 36 and 38. When the locking pawl 22 moves to the locked position, the extension or pin 58 moves along the latch plate 24 to the area of the recess 60 therein whereby the latch plate rotates in the counterclockwise direction, as viewed in FIG. 5, to the latched position. When the latch plate 24 is in the latched position, as illustrated in FIG. 5, the locking pawl 22 is retained in the locked position engaging the ratchet members 36 and 38 of the reel means to prevent their rotation in either direction to prevent either protraction or retraction of the seat belt. When it is desired to retract the seat belt, the latch plate 24 is rotated in the clockwise direction to the unlatched position illustrated in FIG. 4 by placing a tension or force upon the cable 20 whereby the locking pawl 22 is free to move towards the unlocked position the reel means is at least able to rotate in the winding or retracting direction.

The embodiments of the invention in which an exclusive property or privilege is claimed are defined as follows:

1. A retractable seat belt assembly comprising:
   a seat belt;
   a retractor means including a support means and a reel means rotatably supported by said support means, said seat belt being connected to said reel means and adapted to be retracted and protracted by being wound and unwound therefrom;
   a locking pawl movable between locked and unlocked positions, said locking pawl in engagement with said reel means when in said locked position and an unlocked position out of engagement with said reel means;
   a latch means movably supported by said support means for movement between latched and unlatched positions whereby said latch means engages and disengages said locking pawl into and out of said locked position; and
   clutch means for moving said locking pawl between said locked and unlocked positions in response to rotation of said reel means, and movable stop means for preventing movement of said locking pawl to said locked position by said clutch means until a predetermined length of said seat belt has been unwound from said reel means.

2. A retractable seat belt assembly comprising:
   a seat belt;
   a retractor means including a support means and a reel means rotably supported by said support means, said seat belt being connected to said reel means and adapted to be retracted and protracted by being wound and unwound therefrom;
   a locking pawl movable between locked and unlocked positions, said locking pawl in engagement with said reel means when in said locked position and an unlocked position out of engagement with said reel means;
   a latch means movably supported by said support means for movement between latched and unlatched positions whereby said latch means engages and disengages said locking pawl into and out of said locked position;
   biasing means for urging said latch means to said latched position;
   said locking pawl and said latch means are interconnected by an extension and a recess when in the locked and latched positions respectively, said latch means being movable to said latched position when said locking pawl is in said locked position;
   release means for moving said latch means from said latched position to said unlatched position to allow said locking pawl to move to said unlocked position thereby allowing said reel means to rotate; and
   clutch means for moving said locking pawl between said locked and unlocked positions in response to rotation of said reel means, and movable stop means for preventing movement of said locking pawl to said locked position by said clutch means until a predetermined length of said seat belt has been unwound from said reel means.

3. An assembly as set forth in claim 2 wherein said release means comprises a manually actuatable push-pull remote control assembly.

4. An assembly as set forth in claim 3 wherein said clutch means and said stop means are mechanically connected to and operated by said reel means.

5. An assembly as set forth in claim 4 wherein said support means includes a generally U-shaped bracket having a base and parallel side walls, and a shaft extending between said side walls; said reel means includes a cylinder concentrically disposed about said shaft, a circular plate-like ratchet member secured to each end of said cylinder, said ratchet members being supported by said shaft for rotation relative to said bracket, said cylinder having a slot extending therealong, said seat belt being connected to said shaft and extending through said slot to be wound and unwound about said cylinder, and biasing means for urging said ratchet member and said cylinder to rotate in the winding direction; said locking pawl being supported by and extending between said walls; said clutch means comprises a clutch plate rotatably supported on said shaft between a first of said walls and the adjacent ratchet member, a friction member disposed between said clutch plate and said adjacent ratchet member, and means biasing said clutch plate into engagement with said friction member, said clutch plate being operatively connected to said locking pawl through said extension and a slot in said latch means; said stop means includes a stop member engageable with said clutch plate and movable between a stop position for preventing rotation of said clutch plate in the direction for moving said locking pawl to said locking position and a release position for allowing such rotation of said clutch plate, a cam member secured to the second of said ratchet members and having a cam track which is at least in part spirally disposed about the axis of said shaft, a cam follower disposed in said cam track, and linkage means operatively interconnecting said cam follower and said stop member so that said stop member is prevented from moving from said stop position until said cam follower has been moved radially relative to said axis a predetermined amount as a result of the rotation of said reel means by unwinding said seat belt said predetermined length; said first wall has an opening therethrough; said extension being connected to said locking pawl and extending through said opening in said first wall; said latch means includes a latch plate supported by said shaft outwardly of said first wall, said recess being disposed in said latch plate for coating with said extension from said locking pawl; said push-pull remote control assembly being connected to said latch plate for moving the latter to said unlatched position where said extension is out of said recess whereby said locking pawl may move to said unlocked position.

References Cited
UNITED STATES PATENTS

| | | |
|---|---|---|
| 2,257,099 | 9/1941 | Beirise _____ 242—107.4 |
| 3,240,510 | 3/1966 | Spouge _____ 242—107.4 X |
| 3,526,431 | 9/1970 | Boedigheimer et al. 242—107.4 X |
| 3,511,450 | 5/1970 | Aweimrine _____ 242—107.4 |
| 3,412,952 | 11/1968 | Wohlert et al. _____ 242—107.4 |

STANLEY N. GILREATH, Primary Examiner

W. H. SCHROEDER, Assistant Examiner

U.S. Cl. X.R.

242—107.6